United States Patent [19]

Beyl

[11] 4,383,700
[45] May 17, 1983

[54] SKI BRAKE

[75] Inventor: Jean J. A. Beyl, Nevers, France

[73] Assignee: Ste Look, Nevers, France

[21] Appl. No.: 224,555

[22] PCT Filed: Mar. 20, 1980

[86] PCT No.: PCT/FR80/00041
§ 371 Date: Nov. 20, 1980
§ 102(e) Date: Nov. 14, 1980

[87] PCT Pub. No.: WO80/01989
PCT Pub. Date: Oct. 2, 1980

[30] Foreign Application Priority Data

Mar. 20, 1979 [FR] France ............................... 79 06951

[51] Int. Cl.³ .............................................. A63C 7/10
[52] U.S. Cl. ................................................... 280/605
[58] Field of Search ......................................... 280/605

[56] References Cited

U.S. PATENT DOCUMENTS

| 3,989,271 | 11/1976 | Riedel | 280/605 |
| 4,108,466 | 8/1978 | Weigl et al. | 280/605 |
| 4,138,137 | 2/1979 | Beyl | 280/605 |
| 4,173,354 | 11/1979 | Murata | 280/605 |
| 4,174,853 | 11/1979 | Riedel | 280/605 |

FOREIGN PATENT DOCUMENTS

| 2920517 | 1/1980 | Fed. Rep. of Germany | 280/605 |
| 2318658 | 2/1977 | France | 280/605 |
| 2388572 | 11/1978 | France | 280/605 |
| 2388573 | 11/1978 | France | 280/605 |
| 2400374 | 3/1979 | France | 280/605 |
| 2409061 | 6/1979 | France | 280/605 |

Primary Examiner—David M. Mitchell
Attorney, Agent, or Firm—Jordan B. Bierman; Linda Bierman

[57] ABSTRACT

This ski brake comprises two pivoting brake arms disposed symmetrically on either side of the ski and having each an operative portion movable between a lower braking position and a raised retracted inoperative position, the opposite ends of the brake arms carrying a control pedal hinged to bent extensions of the opposite ends of the brake arms. When the pivoting brake arms are in their retracted inoperative position above the ski top and the pedal is pressed against the ski top, the axes of the bent extensions form an obtuse angle having its vertex directed away from the brake shoes carried by the operative portions of the brake arms. These brake arms are on the other hand so shaped that when inoperative the brake shoes are retracted inwards of the ski edges, above the ski top. When the ski boot is lifted off the brake control pedal, the latter is urged by spring means to its raised position while both brake shoes are divaricated and lowered to their operative position clear of the ski edges.

8 Claims, 7 Drawing Figures

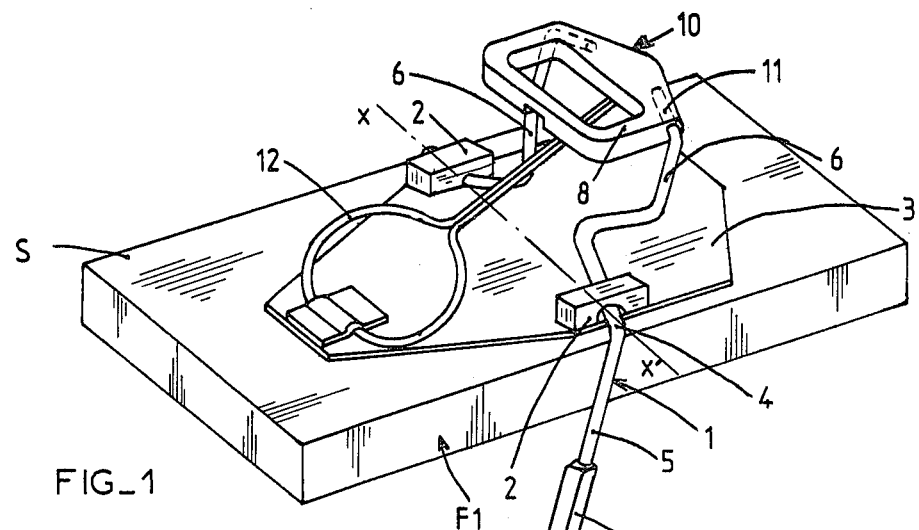
FIG_1
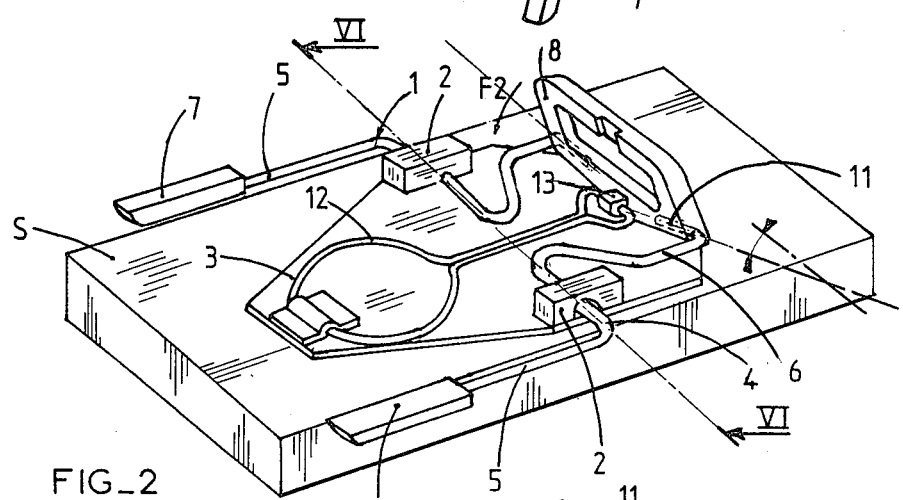
FIG_2
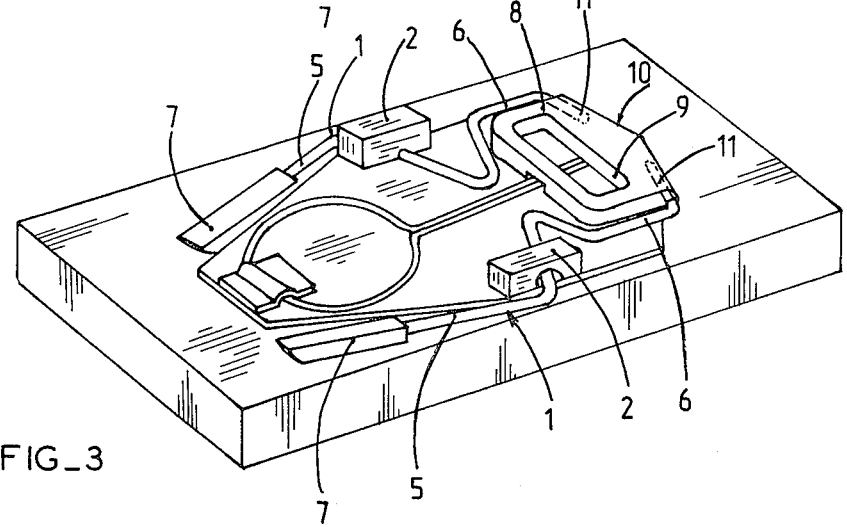
FIG_3

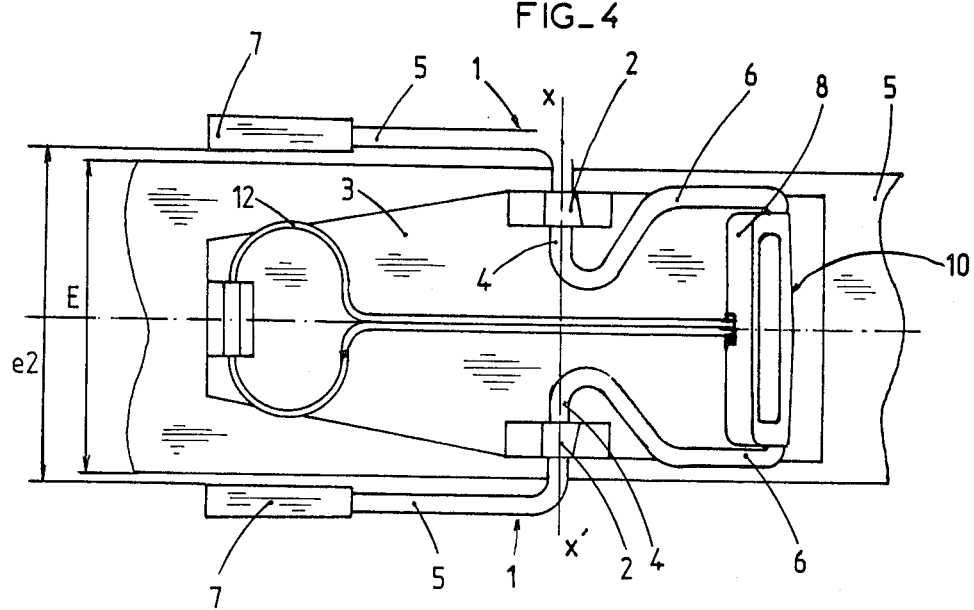
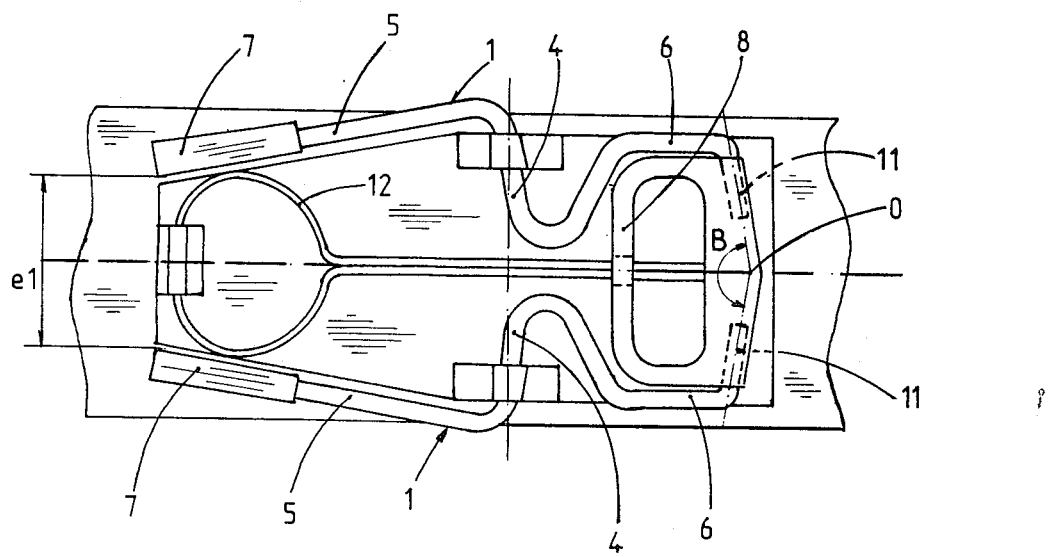

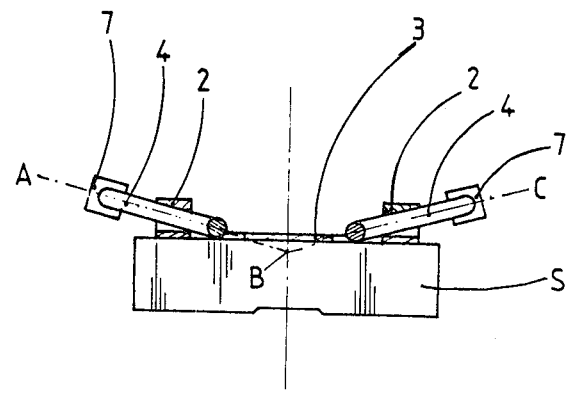
FIG_6
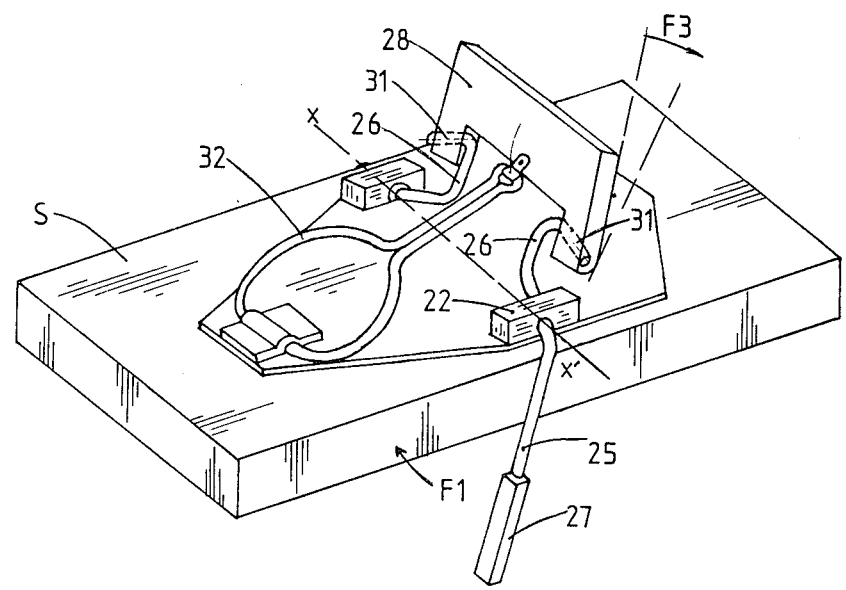
FIG_7

SKI BRAKE

BACKGROUND OF THE INVENTION

1. Field of the Invention

The present invention relates to a ski brake of which the braking shoes are retracted to a flush-fitting position so that they do not project from the side edges of the ski.

2. The Prior Art

The most popular ski brakes comprise a pair of pivoting brake arms disposed on either side of the ski and pivoted on top thereof about a transverse axis. These arms are interconnected at one end by a cross member acting as a control pedal, a return spring constantly urging said arms to pivot towards their positions in which their end opposite said one end is lowered with respect to the bottom surface of the ski, so as to penetrate into the underlying snow layer. Ski brakes of this character consist as a rule of metal wire and in this case the transverse pivot means may consist of a pair of elbows formed integrally with the pivot arms, respectively.

When the ski boot is fitted to the ski, it exerts a pressure upon the control pedal, thus maintaining the operative portions of the brake arms in a raised or retracted position. However, in this case the operative portions of said arms project outwards in relation to the ski edges, and under certain circumstances this may prove particularly detrimental.

Therefore, certain ski brakes have been so designed that the operative portions of their pivoting arms are moved towards each other above the ski top when they are in their raised and retracted position. Various means have been proposed for maintaining the pivoting arms in this retracted position.

Thus, the French Patent No. 2,272,695 corresponding to U.S. Pat. No. 3,989,271 issued Nov. 2, 1976 discloses a ski brake in which the brake arms are retracted by tensioning the metal wire constituting said arms, by using stretching means in the form of an overcenter device adapted to be flattened by the ski boot pressure. However, in operation this system is not fully reliable, for a considerable force is required for altering the configuration of the brake arm wire. In fact, the stiffness of this wire must on the other hand be sufficient to provide an efficient braking action and prevent the brake arms from being distorted in case of simple shocks.

In another French Patent No. 2,308,389 (application No. 76 11752) the movement of the brake arms to their raised and retracted position is obtained by exerting a pressure on a deformable plate or hinged quadrilateral disposed under the boot location so as to be flattened by the boot when the latter is fitted in position. The arrangement is such that when flattened this plate or hinged quadrilateral causes the two brake arms to move towards each other after having been raised to their retracted position.

However, if the control plate is a bent blade, the latter will exert an excessive pressure on the boot, and this is likely to interfere with the boot release when the safety ski binding is operated, for instance in case of fall. Besides, if the control plate consists of a hinged quadrilateral, the assembly contemplated appears to be particularly complicated and expensive. Moreover, this system is scarcely reliable because its operation is likely to be impaired in case of icing.

In a further French Patent No. 2,330,419 (application No. 75 34137) the brake arms are retracted by means of one or a plurality of cam faces carried for example by an auxiliary pedal. But also in this case the solutions contemplated are not fully satisfactory. In fact, since the movement of retraction of the brake arms is obtained by altering the shape of the metal wire constituting said arms, a considerable effort must be exerted thereon to this end. Moreover, this system also develops additional stress interfering with the normal release of the ski boot by the ski binding.

On the other hand, to avoid abnormal over-all dimensions, the height of the control cam faces must be limited, and this is attended by a detrimental limitation of the retraction movement of the brake arms.

Finally, in another known proposal the brake arm retraction is obtained by causing the brake arm to pivot in a bearing having its axis disposed in a transverse plane in relation to the ski and inclined with respect to the ski top surface (cf. French Patent No. 2,228,506, FIG. 11, Application No. 73 17074). The main advantage of this system is its extreme simplicity. Yet, it is objectionable in that the slightest change in the brake arm configuration may cause this arm to rub the ski edge and possibly be locked thereby, since the inward and upward movements of the ski arm are combined into a single movement. Another inconvenience of this arrangement lies in the fact that to obtain a sufficient inward or retraction movement the pivot bearing must be located at a relatively high level, a requirement that cannot be met if the brake is disposed under the ski boot.

It is therefore clear that all the various systems proposed up to now for retracting the brake arms of ski brakes have serious drawbacks. Under these conditions, the present invention is directed to provide a ski brake wherein the brake arms are retracted by using particularly simple, reliable and economical means; besides, the system of the present invention is extremely simple to operate and exerts on the boot sole a substantially negligible thrust.

SUMMARY OF THE INVENTION

The ski brake according to the present invention, of the type comprising a control or brake pedal fulcrumed to bent extensions of the relevant ends of the pivoting brake arms, is characterized essentially in that it incorporates bearing means in which said extensions are adapted to be trunnioned, and that when said pivoting arms are in their retracted position and overlie the ski top, and when the brake pedal is pressed against this ski top, the axes of said bearing means and of course also the bent extensions of said pivoting arms form an obtuse angle having its vertex opposed to the operative portions of the pivoting arms. Besides, the configuration of these pivoting arms is such that their operative portions are disposed inwardly of the ski edges.

It is another feature characterizing the ski brake of this invention to provide resilient return means constantly urging the brake pedal to its raised or braking position when the pressure exerted thereon by the ski boot is released. Possibly, the resilient return means may at the same time urge the brake arms to their operative position.

With the arrangement of the present invention it is possible to obtain a variation in the relative spacing of the operative portions of the brake arms and consequently the drawing-in thereof to the retracted position, due to the pivotal movement of the control pedal with respect to said arms. Thus, when the brake arms are retracted and the brake pedal is pressed against the ski top, the operative portions of the brake arms remain recessed with respect to the ski edges. On the other hand, the upward movement of the brake pedal, as a consequence of the release thereof by the ski boot, is attended automatically by a divarication of the operative portions of said arms so that they can clear freely the ski edges during their downward travel.

A more detailed description of the mode of operation of the ski brake according to the instant invention will now be given with reference to the accompanying drawings showing diagrammatically by way of illustration typical forms of embodiment thereof, it being understood however that various modifications and changes may be brought thereto without departing from the basic principles of the invention, as will readily occur to those conversant with the art.

THE DRAWINGS

FIGS. 1-3 are perspective views showing a first typical form of embodiment of the ski brake of the invention in its operative or braking position, in an intermediate position with the brake arms simply raised off the snow surface, and in the fully retracted position of said brake arms, respectively;

FIGS. 4 and 5 are plan views from above corresponding to FIGS. 2 and 3, respectively;

FIG. 6 is a cross section taken along the line VI—VI of FIG. 2, which corresponds to the raised position of the operative portions of the brake arms before the complete recessing thereof; and FIG. 7 is a perspective view of a modified form of embodiment of the ski brake of this invention;

DESCRIPTION OF THE PREFERRED EMBODIMENTS

The ski brake illustrated in FIGS. 1-6 of the drawings comprises a pair of pivoting arms 1 of rigid metal wire, adapted to be disposed on either side of the corresponding ski S. These arms 1 are pivoted in a pair of bearings 2, respectively, carried by a mounting plate 3 adapted to be secured to the top surface of the ski in a position such that the axis X X' of said bearings extends at right angles to the ski axis.

The pivoting arms 1 are disposed symmetrically and the pivot portion 4 of each arm consists of a bent or elbow section engaging the relevant bearing 2. It will be seen that these bearings 2 are so arranged that the pivot portions 4 are relatively free therein.

The pivot intermediate portion 4 of each arm 1 defines therein two main portions, namely an operative portion 5 adapted to penetrate into the snow in the braking position and a control portion 6 adapted to be actuated by the corresponding ski boot when the latter is fitted into the ski. Due to their pivotal movement possibility, these two arms 1 can assume two different end positions, namely a waiting position, in which the operative portions 5 thereof are retracted or recessed above the ski top, and an operative position, in which the same portions 5 project downwards, beyond the ski bottom surface (see FIG. 1). Preferably, the outer ends of the operative portions of the brake arms are provided with brake shoes adapted to penetrate into the snow to improve the braking efficiency.

The control portions 6 of brake arms 1 carry a control or brake pedal 8 constituting the only connecting member therebetween. This pedal 8 may consist of a relatively thick metal plate provided with a large aperture 9 for the purpose of preventing snow from being trapped between the ski and the brake pedal 8 when the latter is folded down onto the ski. Adjacent its edge 10 opposite the brake shoes 7 the brake pedal is pivoted to bent extensions 11 of the relevant ends of the pair of brake arms. For this purpose, bores are formed in the thickness of the pedal 8 to constitute bearings in which the bent extensions 11 of the brake arms are trunnioned.

According to an essential feature characterizing the ski brake of this invention, the axes of the pedal bearings, and those of the extensions 11 of the pivoting arms, form with each other an obtuse angle $\beta$ when the pivoting arms are retracted or recessed above the ski top and the control or brake pedal itself is caused to bear flat on the ski top (see FIG. 5). The value of this angle may lie between 120° to 170°, and a preferred value is 150°. The vertex 0 of this angle is directed away from the brake shoes 7. Besides, the shape of the pivoting brake arms is such that in this fully retracted brake position the relative spacing e1 between the ends of brake shoes 7 has its minimum value, so that said ends are somewhat recessed in relation to the ski edges.

Finally, a draw-spring 12 is provided which has one end pivotally mounted on base plate 3 and the opposite end attached to control pedal 8 at a central location 13 of the lower surface thereof adjacent the edge 9 opposite the brake shoes 7. Thus, this spring 12 constantly urges the brake pedal 8 away from the ski top and when the ski boot is lifted off the ski it releases the pedal 8 which is thus allowed to pivot about the bent extensions 11 of brake arms 1. However, this spring 12 also urges the brake arms 1 to their operative position.

In the example illustrated, the return spring 12 consists of resilient metal wire adapted to undergo an elastic deformation. However, any other suitable elastic return means could be substituted therefor. Possibly, two separate sets of resilient return means could be provided, one set acting upon the pivoting arms and the other upon the control pedal.

With this arrangement, the upward movement of control pedal 8 permitted by the movement of the ski boot away from the ski top is attended by a specific movement of the two brake arms with respect to each other, and also by an increment in the relative spacing of the brake shoes 7. This spacing will thus reach a value e2 slightly greater than the ski width E (see FIG. 4), so that the brake shoes 7 can move freely on either side of the ski when the brake arms 1 move from their inoperative position to their operative position by pivoting in the corresponding bearings 2.

When the ski boot is fitted in position, the reverse action takes place. In fact, the pressure exerted by the boot on the end portions 11 of brake arms 1 firstly causes these arms 1 to pivot in the direction of the arrow F1 (FIG. 1) to a position in which the brake shoes 7 are at a higher level than the ski top, which is an intermediate position corresponding simply to the raising of the brake shoes 7 as illustrated in FIGS. 2 and 4 of the drawings.

In this intermediate position the relative spacing e2 of the brake shoes 7 is slightly greater than the ski width E, and the brake pedal 8 is still raised with respect to the ski surface (see FIG. 2). However, when the ski boot is caused to bear again on the ski, the pedal 8 is folded down by pivoting as shown by the arrow F2 about the bent extensions 11 of brake arms 1, so that a specific movement which is the reverse of the specific movement described hereinabove is impressed to said brake arms. In fact, this reverse specific movement causes the brake shoes 7 to move towards each other, above the ski surface. As can be observed, during the retraction of the ski brake assembly the control pedal 8 is caused to pivot in a direction opposite the direction of the pivotal movement accomplished by the brake arms.

Furthermore, when the brake pedal 8 is restored to its ski-engaging position shown in FIGS. 3 and 5, the relative spacing of brake shoes 7 is reduced to its minimum value e1 so that the shoe brakes are somewhat recessed in relation to the ski edges.

The specific movement impressed to the brake arms by the pivotal movement of the control pedal in either direction is due of course to the oblique direction of the bent extensions 11 of brake arms 1 and also of the matching holes provided therefor in the pedal, which constitute the bearings for journaling said extensions.

In fact, with this particular arrangement (i.e. the inclined position of extensions 11 and of the bore receiving them in the pedal) the brake shoes 7 carried by the pivoting brake arms 1 have their minimum relative spacing in the position illustrated in FIG. 5. However, in the wholly theoretical hypothesis that the control pedal 8 might occupy the reverse position, in which it would again bear flat on the ski top, the brake arms would have their maximum relative spacing. Between these two extreme positions of the control pedal, the relative spacing of the brake shoes will thus vary continuously as a function of the value of the angle formed between the control pedal and the planes formed by the brake arms.

In this respect, it will also be observed that it is only in one or the other of said end positions of the control pedal that the planes containing the two brake arms merge into each other and are parallel to the ski top. In fact, between these two end positions, the planes A B and B C containing these two arms are concurrent and constitute a dihedron having its aperture directed upwardly (see FIG. 6), while its edge extends parallel to the longitudinal center line of the ski. Now, the inner angle of the dihedron varies continuously as a function of the angular position of the brake pedal with respect to the brake arms.

In fact, if this pedal were rotated fully about itself the bent extension 11 of each brake arm would be shifted along the generatrices of a cone. But in the present instance only a limited portion of this movement is utilized for obtaining the desired change in the relative spacing of the brake shoes 7.

It may also be pointed out that in the fully retracted brake position the return spring 12 is disposed very close to the ski top. Under these conditions, the extra force exerted on the ski boot is substantially zero. However, the main advantageous feature of the ski brake of the present invention lies in its extreme simplicity of construction and operation and also in its reliability under actual service conditions. Besides, due to its elementary simplicity, the cost of this brake is particularly low.

Preferably, the ski brake according to the present invention is intended for mounting between the front and rear devices constituting the safety ski binding releasably retaining the ski boot on the ski. Certain component elements of the ski brake of this invention, notably the control pedal, may be lined with antifriction material such as polytetrafluoroethylene (Teflon) to facilitate the smooth sliding contact between the pedal and the ski boot during the release of the latter. However, the ski brake of this invention could also be incorporated in the safety ski binding.

FIG. 7 illustrates a modified form of embodiment of the ski brake of this invention, in which the arrangement is such that the control pedal 28 is caused to pivot in the same direction as the brake arms 25 during the retraction of said arms.

To this end, the position of the pivot means of this brake pedal is inverted with respect to the position contemplated in the preceding form of embodiment. In fact, the bores formed in the pedal for receiving the trunnion-like bent extensions 31 of the operative portions 26 of brake arms 25 are located near the pedal edge adjacent the brake shoes 27.

Thus, when the ski boot is caused to bear on the brake assembly, the control pedal 28 is pivoted in the direction of the arrow F3, i.e. in the same direction as the brake arms.

Otherwise, the other component elements of this modified version of the ski brake are arranged like those of the preceding example. In fact, the bent extensions 31 of the brake arms form an obtuse angle with each other, the vertex of this angle being directed away from the brake shoes 27. Thus, when the brake pedal 28 is caused to pivot towards the ski top the brake shoes 27 are moved towards each other above the upper ski surface as in the preceding form of embodiment, after the brake shoes have been raised to a level higher than said upper ski surface.

Of course, when the brake pedal 28 is pivoted in the opposite direction by the corresponding return spring 32 attached at 33 to said pedal, the brake shoes 27 are divaricated and can thus clear freely the ski edges and move to their lower operative position.

Of course, it will readily occur to those conversant with the art that other forms of embodiment, modifications and changes may be brought to this ski brake without departing from the basic principles thereof.

Having thus described the invention, what is claimed is:

1. In a ski brake comprising a pair of pivoting brake arms disposed symmetrically on one and the other side of the ski, said brake arms each having an individual operative end portion movable between a lowered braking position and a raised retracted position, an opposite end portion supporting a control pedal between them and an intermediate bent portion pivotally mounted on the ski with angular play in the ski plane and in the transverse direction, and spring means urging the said arms into their braking position, the improvement comprising fixed bearing means on opposite sides of said control pedal, and bent extensions on the opposite end portions of said brake arms respectively pivotally mounted in said bearings, said pedal in a relaxed normal position, corresponding to said operative end portion being in a nonretracted position, extending in a plane at an angle to the plane of the opposite end portions, and pivoting under the influence of a ski boot toward the plane of the opposite end portions such that when the pivoting brake arms are in the retracted position above the ski and the pedal presses against the latter, the axes of the respective bearings and the supported extensions form an obtuse angle with one another the vertex of which is directed away from the operative portion of the brake arms, and in which the intermediate bent portion of each arm in the pedal-depressed position of the brake, shifts in their pivoted mounting to move the operative end portions into a recessed retracted position with respect to the ski edges.

2. Ski brake according to claim 1 in which the bent extensions on the opposite end portions of said brake arms extend inwardly of said ski into the bearings of the control pedal.

3. Ski brake according to claim 1, in which the bent extensions on the opposite end portions of said brake arms extend outwardly of said ski into the bearings of the control pedal.

4. Ski brake according to claims 1, 2 or 3, in which the obtuse angle formed by said bent extensions of said pivoting brake arms when the latter are fully retracted and said control pedal is held against the ski top, has a value of 120° to 170°.

5. Ski brake according to claims 1, 2 or 3, in which the obtuse angle formed by said bent extensions of said pivoting brake arms when the latter are fully retracted and said control pedal is held against the ski top, has a value of 150°.

6. The ski brake according to claims 1, 2 or 3, in which said control pedal consists of a plate having formed in its thickness the bearings for trunnioning said bent extensions of said pivoting brake arms.

7. The ski brake according to claim 6, in which the obtuse angle formed by said bent extensions of said pivoting brake arms when the latter are fully retracted and said control pedal is held against the ski top, has a value of 120° to 170°.

8. The ski brake of claim 7 wherein said value is 150°.

* * * * *